Feb. 24, 1925.
L. M. BROWN ET AL
1,527,466
DUMP TRAILER POWER TRANSMISSION
Filed Feb. 25, 1924      2 Sheets-Sheet 1
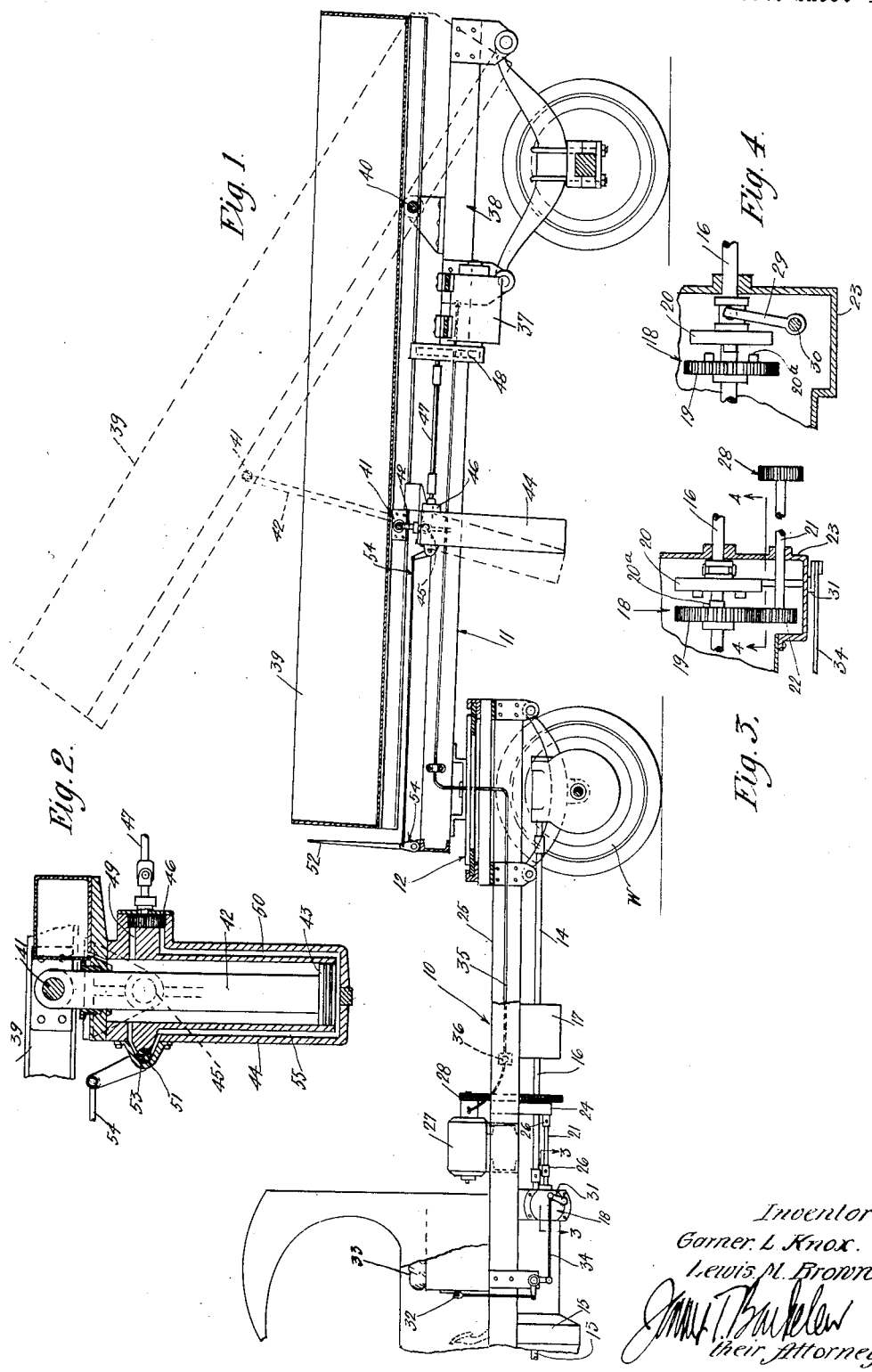
Inventors.
Garner L. Knox.
Lewis M. Brown.
their Attorney.

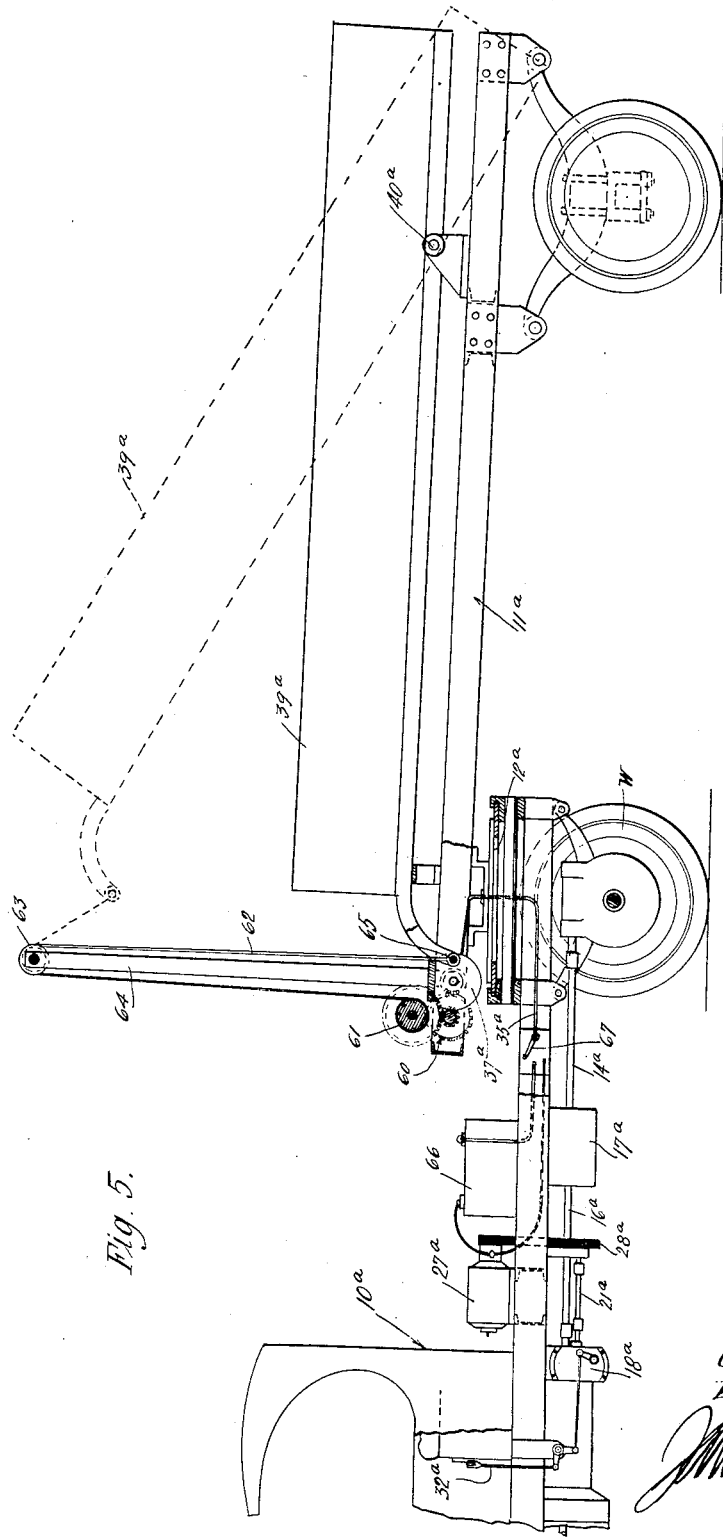

Patented Feb. 24, 1925.

1,527,466

UNITED STATES PATENT OFFICE.

LEWIS M. BROWN AND GARNER L. KNOX, OF LOS ANGELES, CALIFORNIA, ASSIGNORS TO UTILITY TRAILER MANUFACTURING COMPANY, OF LOS ANGELES, CALIFORNIA, A CORPORATION OF CALIFORNIA.

DUMP-TRAILER POWER TRANSMISSION.

Application filed February 25, 1924. Serial No. 694,952.

*To all whom it may concern:*

Be it known that we, LEWIS M. BROWN and GARNER L. KNOX, citizens of the United States, residing in the city of Los Angeles, county of Los Angeles, State of California, have invented new and useful Improvements in Dump-Trailer Power Transmission, of which the following is a specification.

This invention relates to means for transmitting power from an auto truck to the elevating mechanism of a dump body on a trailer towed by the truck.

For economic reasons, which need not here be entered into in detail, it is becoming the prevailing custom to utilize dump trailers rather than providing the trucks proper with dump bodies. One advantage gained by the trailer arrangement resides in the fact that the load is distributed over six or eight wheels rather than only the four wheels of the truck, thus rendering the load much less destructive to roadways and pavements.

However, certain conditions exist in connection with the installation of dump bodies on trailers which make it difficult to secure efficient operation. For instance, while the body elevating mechanism is mounted on the trailer, the actuating power must be developed on the leading vehicle, and due to the existence of and provision for relative movement between trucks and trailer, the transmission of power from truck to dump body elevating mechanism must be accomplished through some sort of flexible connection at the point of coupling between truck and trailer. Dump body hoists are of two general types, viz, hydraulic and mechanical. As previously designed, in conjunction with a hydraulically operated hoist on a dump trailer, it was necessary to install the pump mechanism on the truck and connect it to the hoist cylinder on the trailer by flexible tubing, an unsatisfactory arrangement, partly due to the difficulty of maintaining the tubing in fluid tight condition. In mechanically operated hoists, there was the necessity of a flexible shaft between the power shaft on the truck and the elevating mechanism on the trailer, a most undesirable feature due to the severe conditions to which the mechanism was exposed.

We have successfully met the problem by providing a generator on the truck and a motor on the trailer. The generator is adapted to be intermittently connected to a shaft deriving its power from the truck engine, while the motor is operatively connected to the hoisting mechanism, whether the latter be of the hydraulic or mechanical type. It is then only necessary to extend wiring from generator to motor and provide means for controlling the operation of the generator. How this is done will be fully explained in the following detailed description, reference being had to the accompanying drawings, in which—

Figure 1 is a side elevation of a truck and trailer, showing our transmission used in connection with a hydraulic hoist.

Fig. 2 is an enlarged vertical section through the hoist cylinder.

Fig. 3 is horizontal section through the power take-off on the truck, and is taken about on the line 3—3 of Fig. 1.

Fig. 4 is a vertical section about on the line 4—4 of Fig. 3.

Fig. 5 shows our transmission applied to a body hoist of the drum and cable type.

In the drawings we have illustrated our power transmission as applied to certain types of trucks and trailers which are coupled in a specific manner, and to certain types of hoisting apparatus, but it will be understood these drawings, and the following description thereof, are to be considered merely as illustrative of and not restrictive on the appended claims. It will be apparent to those skilled in the art how the same principle may be applied to trucks and trailers of other designs. It will also be apparent that certain changes in the design and arrangement of our transmission may be made without departing from the spirit and scope of our invention.

In Figure 1, the truck 10 and trailer 11 are coupled at 12 so as to be capable of the necessary relative movement. A power shaft 13, driven by the truck motor (not shown) is connected to propeller shaft 14 through clutch 15, intermediate shaft 16 and transmission 17, all of any usual and well known construction. Between clutch 15 and transmission 17 is the power take-off 18. This also may be of any well known type. In Figs. 3 and 4 we have shown, somewhat conventionally, such a take-off in detail. A gear 19 is loose on shaft 16, while clutch disk 20 is keyed but slidable on this shaft. A countershaft 21 carries pinion 22 in mesh with gear 18, and extends through housing 23 to bearing 24 which is supported by truck frame 25, universal joints 26 allowing for relative movement between housing and frame. Shaft 21 is operatively connected to generator 27, on frame 25, by sprocket and chain drive 28.

A shifter fork 29 is mounted on rock shaft 30 which is journaled in housing 23 and terminates in crank 31 exterior of the housing. An operating lever 32, handy to the grasp of the truck operator from his position on seat 33, is connected to crank 31 by crank and link system 34, whereby proper manipulation of said lever 32 rocks shaft 30 to engage or disengage clutch disk 20 with respect to clutch elements 20$^a$ on gear 19. When the take-off clutch is engaged, gear 19 drives shaft 21 and hence generator 27.

Since power take-off 18 is between clutch 15 and transmission 17, generator 27 may be driven when propeller shaft 14 and drive wheels W, are at rest, while the drive of the generator from shaft 16 may be controlled with respect to the constantly rotating power shaft 13, by actuation of the usual clutch 15. Wires 35 lead from generator 27 through attachment plug 36 to motor 37 on trailer frame 38, and thus place the motor and generator in circuit, so, when the generator is driven through the mechanism just described, electricity is supplied to motor 37 which is thereupon driven to actuate the hoisting mechanism.

Dump body 39 is fulcrumed to frame 38 at 40 and its forward end is secured at 41 to piston rod 42 on piston 43, the latter being adapted to be reciprocated within cylinder 44 which is swung from frame 38 at 45. A gear pump 46 is adapted to be driven by shaft 47 which is operatively connected to motor 37 through reduction gearing 48.

When motor 37 is driven by starting up generator 27, pump 46 draws oil through port 49 from above piston 43 and passes it through duct 50 back into cylinder 44 at a point beneath the piston, thus elevating body 39 to dumping position, as shown in dotted lines. When at the upper limit of its stroke, piston 43 closes off port 49, thus automatically stopping the hoist, even though the motor continues in operation. We may also provide means for automatically opening the circuit to motor 37 or otherwise provide for the automatic cutting off of power when the dump body reaches its position of full elevation. It is obvious that the elevating speed may be varied by varying the generator output, and that the output may be varied through changes in speed of the power shaft or intermediate shaft.

To lower body 39, by-pass 51 is opened by proper manipulation of lever 52 which is connected with valve plug 53 by crank and link system 54. The weight of body 39, acting through piston rod 42, forces the oil from beneath piston 43 whence it passes upwardly through way 55 and open by-pass 51 into the upper part of the cylinder.

In Fig. 5, parts which correspond to similar parts in Fig. 1 are designated by the same numerals with the exponent "a". Motor 37$^a$ is connected by gearing 60 to drum 61 which is connected to body 39$^a$ by cable 62, the latter passing over sheave 63 at the top of mast 64 and being secured to body 39$^a$ at 65. It is apparent that by driving generator 27$^a$ from power take-off 18$^a$, current is supplied to motor 37$^a$ which thereupon acts to revolve drum 61, the latter taking up cable 62 and elevating body 39$^a$ to the position shown in dotted lines.

In certain instances, we may install a storage battery 66 on truck 10, the battery being in circuit with and charged by generator 27 during periods when the hoisting mechanism is not in use, switch 67 serving to open the motor circuit. Switch 67 may then be adjusted to selectively utilize the battery or the direct generator circuit for operating the motor.

Since flexible wires comprise the only connection between power source and dump actuating mechanism on truck and trailer, it will be seen that we have provided a system which effectively meets the conditions peculiar to the situation, but we wish to repeat that certain variances in design, structure and arrangements over the showing in the drawings, may be made without departing from the spirit and scope of the claims appended hereto.

We claim:

1. In combination with a towing vehicle and a trailer towed thereby, a dump body on the trailer, mechanism on the trailer for elevating said body to dumping position, an electric motor on the trailer and operatively connected to and adapted to actuate said elevating mechanism, a source of electricity on the towing vehicle, and means for putting said source and said motor in circuit whereby the motor is driven to actuate said elevating mechanism.

2. In combination with a towing vehicle and a trailer towed thereby, a dump body on the trailer, mechanism on the trailer for elevating said body to dumping position, an electric motor on the trailer and operatively connected to and adapted to actuate said elevating mechanism, a generator on the towing vehicle and in circuit with the motor, and means for driving the generator in a manner to pass electricity to and drive the motor, whereby the motor causes actuation of said elevating mechanism.

3. In combination with a towing vehicle and a trailer towed thereby, a dump body on the trailer, mechanism on the trailer for elevating said body to dumping position, an electric motor on the trailer and operatively connected to and adapted to actuate said elevating mechanism, a generator on the towing vehicle and in circuit with the motor and means for intermittently driving the generator in a manner to pass electricity to and drive the motor, whereby the motor causes actuation of said elevating mechanism; and means for controlling the output of said generator.

4. In combination with a towing vehicle and a trailer towed thereby, a dump body on the trailer, mechanism on the trailer for elevating said body to dumping position, said mechanism including a piston operatively connecting the dump body and the chassis of the trailer, and a pump adapted to hydraulically operate the piston; an electric motor on the trailer and operatively connected to said pump, a source of electricity on the towing vehicle, and means for putting said source and said motor in circuit whereby the motor is driven to actuate said pump.

5. In combination with a towing vehicle and a trailer towed thereby, a dump body on the trailer, mechanism on the trailer for elevating said body to dumping position, said mechanism including a piston operatively connecting the dump body and the chassis of the trailer, and a pump adapted to hydraulically operate the piston; an electric motor on the trailer and operatively connected to said pump, a generator on the towing vehicle and in circuit with the motor, and means for intermittently driving the generator in a manner to pass electricity to and drive the motor intermittently, whereby the motor causes actuation of said elevating mechanism.

6. The combination with a towing vehicle which has a driven shaft, of a trailer adapted to be towed by said towing vehicle, a dump body on the trailer, mechanism on the trailer for elevating said body to dumping position, an electric motor on the trailer and operatively connected to and adapted to actuate said elevating mechanism, a generator on the towing vehicle and in circuit with the motor, and means for intermittently connecting said driven shaft to the generator in a manner to drive the generator and thereby pass electricity to the motor for actuating said elevating mechanism.

7. The combination with a towing vehicle which has a driven shaft, of a trailer adapted to be towed by said towing vehicle, a dump body on the trailer, mechanism on the trailer for elevating said body to dumping position, an electric motor on the trailer and operatively connected to and adapted to actuate said elevating mechanism, a generator on the towing vehicle and in circuit with the motor, and clutch means for intermittently connecting said driven shaft to the generator in a manner to drive the generator and thereby pass electricity to the motor for actuating said elevating mechanism.

8. The combination with a towing vehicle which has a driven shaft, of a trailer adapted to be towed by said towing vehicle, a dump body on the trailer, mechanism on the trailer for elevating said body to dumping position, an electric motor on the trailer and operatively connected to and adapted to actuate said elevating mechanism, a generator on the towing vehicle and in circuit with the motor, a countershaft on the towing vehicle and operatively connected to the generator, and means for intermittently connecting said driven shaft to said countershaft in a manner to cause operation of the generator and thereby pass electricity to the motor for actuating said elevating mechanism.

9. The combination with a towing vehicle which has a power shaft, a propeller shaft, and an intermediate shaft, the intermediate shaft being operatively connected to the propeller shaft, and clutch means for intermittently connecting the power and intermediate shafts; of a trailer adapted to be towed by said towing vehicle, a dump body on the trailer, mechanism on the trailer for elevating said body to dumping position, an electric motor on the trailer and operatively connected to and adapted to actuate said elevating mechanism, a generator on the towing vehicle and in circuit with the motor, and means for intermittently connecting the generator and said intermediate shaft in a manner to drive the generator and thereby pass electricity to and drive the motor for actuating said elevating mechanism.

In witness that we claim the foregoing, we have hereunto subscribed our names this 28th day of January, 1924.

LEWIS M. BROWN.
GARNER L. KNOX.